United States Patent
Park et al.

(10) Patent No.: US 9,572,092 B2
(45) Date of Patent: Feb. 14, 2017

(54) METHOD AND APPARATUS FOR ACTIVE SCANNING IN WIRELESS LAN

(71) Applicant: LG ELECTRONICS INC., Seoul (KR)

(72) Inventors: Giwon Park, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/431,680

(22) PCT Filed: Oct. 15, 2013

(86) PCT No.: PCT/KR2013/009216
§ 371 (c)(1),
(2) Date: Mar. 26, 2015

(87) PCT Pub. No.: WO2014/061978
PCT Pub. Date: Apr. 24, 2014

(65) Prior Publication Data
US 2015/0245283 A1    Aug. 27, 2015

Related U.S. Application Data

(60) Provisional application No. 61/713,636, filed on Oct. 15, 2012, provisional application No. 61/717,081, filed on Oct. 22, 2012.

(51) Int. Cl.
*H04W 4/00* (2009.01)
*H04M 1/00* (2006.01)
(Continued)

(52) U.S. Cl.
CPC .............. *H04W 48/16* (2013.01); *H04W 48/14* (2013.01); *H04W 84/12* (2013.01); *H04W 84/14* (2013.01)

(58) Field of Classification Search
CPC ............. H04W 48/14; H04W 36/0083; H04W 36/0055; H04W 48/16; H04W 4/008; H04W 72/02; H04W 52/50
(Continued)

(56) References Cited

U.S. PATENT DOCUMENTS 7,706,822 B2    4/2010  Emeott et al.
7,801,546 B2 *  9/2010  Yang ..................... H04W 52/50
                                                            455/522
(Continued)

FOREIGN PATENT DOCUMENTS

EP    2844018        3/2015
JP    2004509514 A   3/2004
(Continued)

OTHER PUBLICATIONS

PCT International Application No. PCT/KR2013/009216, Written Opinion of the International Searching Authority dated Jan. 2, 2014, 1 page.
(Continued)

*Primary Examiner* — William D Cumming
(74) *Attorney, Agent, or Firm* — Lee, Hong, Degerman, Kang & Waimey

(57) ABSTRACT

A method and corresponding device for performing active scanning in a wireless local area network (LAN). The method includes: receiving, by a first station (STA), a second probe request frame from a second STA, wherein the second probe request frame is transmitted based on broadcast; and determining, by the first STA, whether to transmit a first probe request frame for an active scanning based on the second probe request frame. The first STA determines not to transmit the first probe request frame if the first STA is capable of receiving information related to an AP to be associated based on the second probe request frame.

10 Claims, 14 Drawing Sheets

(51) Int. Cl.
*H04B 1/38* (2015.01)
*H04B 7/00* (2006.01)
*H04W 48/16* (2009.01)
*H04W 48/14* (2009.01)
*H04W 84/14* (2009.01)
*H04W 84/12* (2009.01)

(58) Field of Classification Search
USPC .......................... 455/432.1, 434, 522, 41.2
See application file for complete search history.

(56) References Cited

U.S. PATENT DOCUMENTS

| | | | |
|---|---|---|---|
| 7,894,405 B2 | 2/2011 | Zhun | |
| 8,131,291 B2* | 3/2012 | Jeong | H04W 48/14 455/432.1 |
| 8,204,029 B2* | 6/2012 | Stephenson | H04L 63/10 370/332 |
| 8,340,665 B2* | 12/2012 | Jeong | H04W 48/14 370/254 |
| 8,411,640 B2* | 4/2013 | Kuroda | H04W 36/0055 370/331 |
| 8,428,028 B2* | 4/2013 | Kim | H04W 36/0083 370/331 |
| 2002/0060995 A1* | 5/2002 | Cervello | H04W 72/02 370/332 |
| 2005/0059353 A1 | 3/2005 | Smith et al. | |
| 2005/0090259 A1 | 4/2005 | Jain et al. | |
| 2005/0136933 A1 | 6/2005 | Sandhu et al. | |
| 2006/0111103 A1* | 5/2006 | Jeong | H04W 48/14 455/434 |
| 2007/0047492 A1* | 3/2007 | Kim | H04W 36/0083 370/331 |
| 2007/0050523 A1 | 3/2007 | Emeott et al. | |
| 2008/0014934 A1 | 1/2008 | Balasubramanian et al. | |
| 2009/0207758 A1 | 8/2009 | Jeong et al. | |
| 2010/0118830 A1* | 5/2010 | Stephenson | H04L 63/10 370/331 |
| 2010/0272095 A1 | 10/2010 | Alberti et al. | |
| 2011/0075589 A1 | 3/2011 | Bradley et al. | |
| 2011/0085532 A1 | 4/2011 | Scherzer et al. | |
| 2011/0090890 A1 | 4/2011 | Seok et al. | |
| 2011/0199980 A1 | 8/2011 | Denteneer | |
| 2012/0076045 A1 | 3/2012 | Pease et al. | |
| 2013/0109314 A1* | 5/2013 | Kneckt | H04W 4/008 455/41.2 |
| 2013/0294354 A1 | 11/2013 | Zhang et al. | |
| 2013/0308530 A1 | 11/2013 | Yang et al. | |
| 2015/0245283 A1* | 8/2015 | Park | H04W 48/16 455/434 |

FOREIGN PATENT DOCUMENTS

| | | |
|---|---|---|
| JP | 2007060670 A | 3/2007 |
| JP | 2010529730 | 8/2010 |
| JP | 2015517767 | 6/2015 |
| JP | 2015519803 | 7/2015 |
| JP | 2015520972 | 7/2015 |
| RU | 2353073 C2 | 4/2009 |
| RU | 2009137211 A | 4/2011 |
| WO | 0223819 A2 | 3/2002 |
| WO | 2006121303 A1 | 11/2006 |
| WO | 2008147130 | 12/2008 |
| WO | 2011090257 A1 | 7/2011 |

OTHER PUBLICATIONS

Japan Patent Office Application No. 2015-536721, Office Action dated Mar. 8, 2016, 2 pages.
Giwon Park et al., " Probe Response Broadcasting", IEEE 802.11-12/0550r6, XP068039024, Jul. 6, 2012, 10 pages.
European Patent Office Application No. 13847348.3, Search Report dated May 11, 2016, 8 pages.
Canadian Patent Office Application No. 2,887,651, First Examination Report dated May 3, 2016, 5 pages.

* cited by examiner

FIG. 1
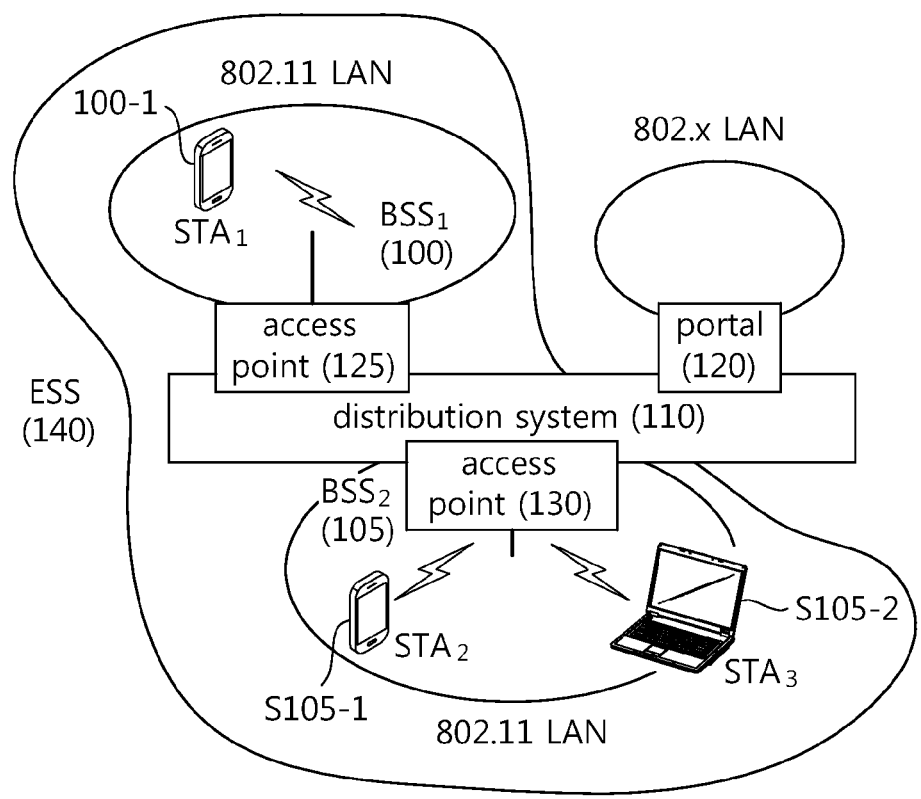
(A)
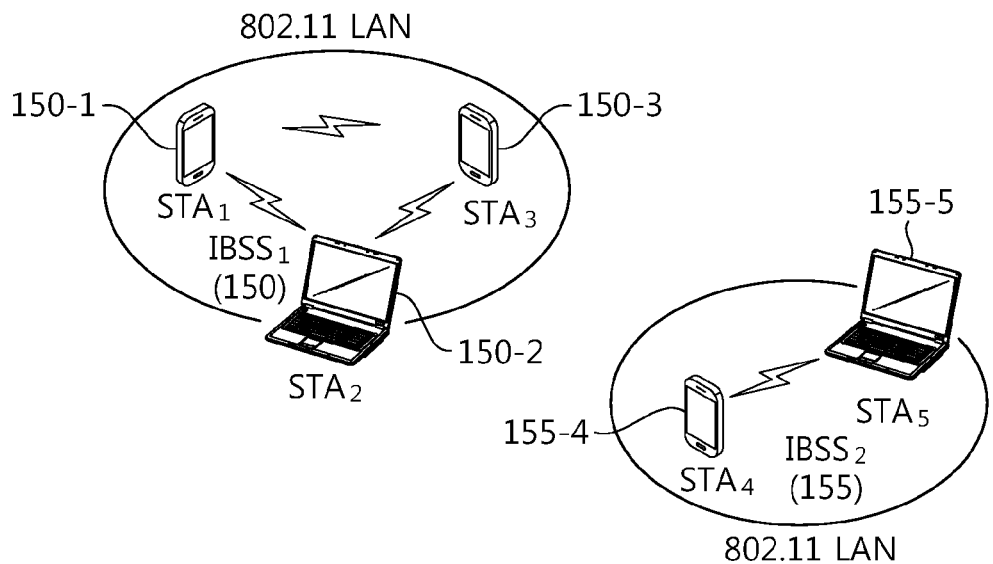
(B)

FIG. 6
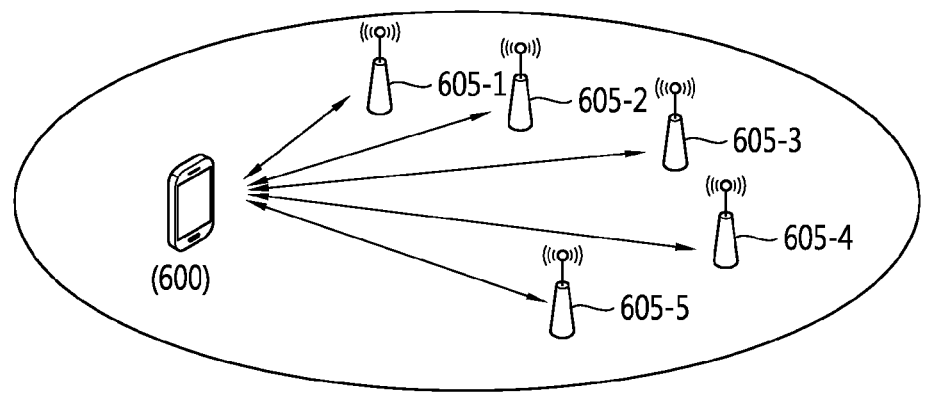
probe request frame (610)
(wildcard, SSID, wildcard BSSID)     (A)
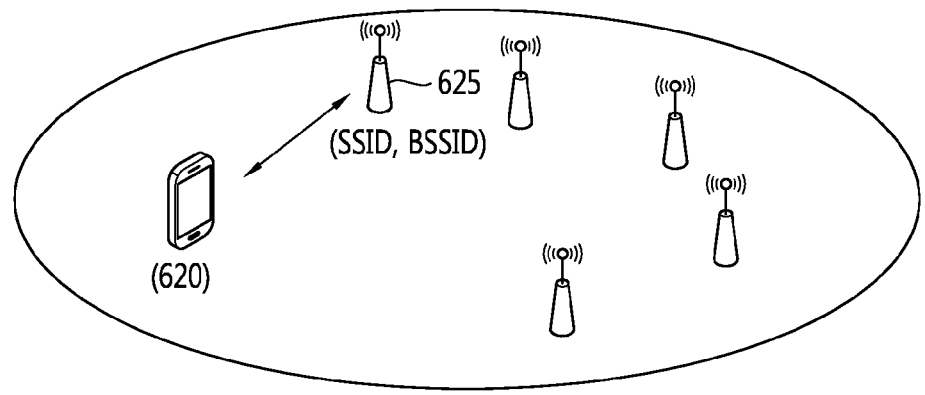
probe request frame(630)
(SSID, BSSID)     (B)
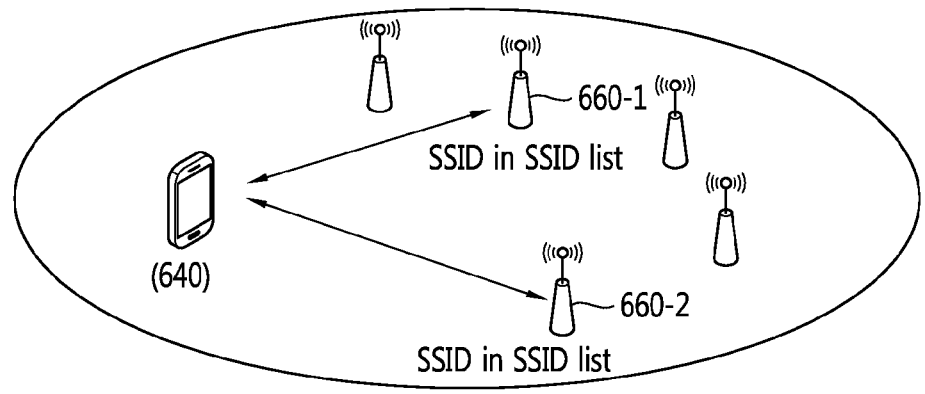
probe request frame (660)
(SSID, wildcard BSSID)     (C)

METHOD AND APPARATUS FOR ACTIVE SCANNING IN WIRELESS LAN

CROSS-REFERENCE TO RELATED APPLICATIONS

This application is the National Stage filing under 35 U.S.C. 371 of International Application No. PCT/KR2013/009216, filed on Oct 15, 2013, which claims the benefit of U.S. Provisional Application Ser. No. 61/713,636, filed on Oct 15, 2012 and 61/717,081, filed on Oct 22, 2012, the contents of which are all hereby incorporated by reference herein in their entirety.

BACKGROUND OF THE INVENTION

Field of the Invention

The present invention relates to a scanning method and apparatus of a station (STA) and, more particularly, to a method and apparatus for performing active scanning by a STA.

Related Art

Recently, wireless LAN technologies have evolved in three directions. IEEE (institute of electrical and electronic engineers) 802.11ac and IEEE 802.11ad, as an extension of an existing WLAN evolutional direction, were released to promote a transfer rate. IEEE 802.11ad is a WLAN technology using a 60 GHz band. Also, a wide area WLAN utilizing a frequency band less than 1 GHz has recently emerged to allow for wide area transmission in terms of distance, relative to the existing WLAN. The wide area WLAN includes IEEE 802.11af utilizing a TV white space (TVWS) band and IEEE 802.11ah utilizing a 900 MHz band. These protocols aim at extending an extended range Wi-Fi service, as well as a smart grid, a wide area sensor network. Also, an existing WLAN medium access control (MAC) technology has a problem that an initial link setup time is too long. In order to solve this problem to allow a STA to quickly access an access point (AP), IEEE 802.11ai standardization has been actively ongoing.

IEEE 802.11ai is a MAC technology handling a fast authentication procedure to remarkably reduce an initial set-up and association time of a WLAN, which started standardization as a formal task group in January 2011. In order to allow for a fast access procedure, IEEE 802.11ai has discussed procedure simplification in regions such as AP discovery, network discovery, time synchronization function (TSF) synchronization, authentication & association, procedure merging with a higher layer, and the like. Among them, ideas such as procedure merging utilizing piggyback of dynamic host configuration protocol (DHCP), optimization of full extensible authentication protocol (EAP) using concurrent IP, effective selective AP scanning, and the like, have been actively discussed.

SUMMARY OF THE INVENTION

The present invention provides a method for active scanning of a station (STA) in a wireless LAN.

The present invention also provides a STA performing active scanning in a wireless LAN.

In an aspect, a method for active scanning in a wireless LAN includes: generating, by a scanning station (STA), scanning information for performing active scanning; receiving, by the scanning STA, a first probe request frame through a reception channel, the first probe request frame being a frame transmitted to an access point (AP) by the STA; starting, by the scanning STA receiving the first probe request frame, a probe timer and performing clear channel assessment (CCA) to detect a channel state in the reception channel; transmitting, by the scanning STA, a second probe request frame to the AP in the reception channel when the channel state is not busy before the probe timer reaches a minimum channel time; and transmitting, by the scanning STA, the second probe request frame to the AP in the reception channel when the channel state is busy before the probe timer reaches the minimum channel time and a probe response frame including at least the same information anticipated to be received by the scanning STA based on the scanning information is not received, wherein the first probe request frame includes a plurality of first fields and the scanning information includes a plurality of second fields, and at least one field among the plurality of first fields includes information which is the same as information included in one field among the plurality of second fields.

In another aspect, an scanning station (STA) in a wireless LAN includes: a radio frequency (RF) unit implemented to transmit or receive a radio signal; and a processor selectively connected with the RF unit, wherein the processor generates scanning information for performing active scanning, receive a first probe request frame through a reception channel, in which the first probe request frame is a frame transmitted to an access point (AP) by the STA, starts a probe timer and performs clear channel assessment (CCA) to detect a channel state in the reception channel, transmits a second probe request frame to the AP in the reception channel when the channel state is not busy before the probe timer reaches a minimum channel time, and transmits the second probe request frame to the AP in the reception channel when the channel state is busy before the probe timer reaches the minimum channel time and a probe response frame including at least the same information anticipated to be received by the scanning STA based on the scanning information is not received, in which the second probe request frame is transmitted to the AP in the reception channel, and the first probe request frame includes a plurality of first fields and the scanning information includes a plurality of second fields and at least one field among the plurality of first fields includes information which is the same as information included in one field among the plurality of second fields.

By enabling a STA to wait for transmission of a probe request frame with reference to a probe request frame of other STA, unnecessary transmission of a probe request frame of the STA may be prevented, and thus, a scanning procedure can be rapidly performed. Also, in a case in which the STA fails to obtain a desired response from an AP in a corresponding channel, the STA may transmit a probe request frame again, thus preventing a situation in which a probe response frame is not received from an AP in spite of the presence of the AP in the corresponding channel due to a problem of a hidden node, a collision problem, or a problem in terms of implementation of an AP can be prevented.

BRIEF DESCRIPTION OF THE DRAWINGS

FIG. 1 is a conceptual view illustrating a structure of a wireless local area network (WLAN).

FIG. 6 is a conceptual view illustrating a method for transmitting a probe request frame.

DESCRIPTION OF EXEMPLARY EMBODIMENTS

FIG. 1 is a concept view illustrating the structure of a wireless local area network (WLAN).

An upper part of FIG. 1(A) shows the structure of the IEEE (institute of electrical and electronic engineers) 802.11 infrastructure network.

Referring to the upper part of FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
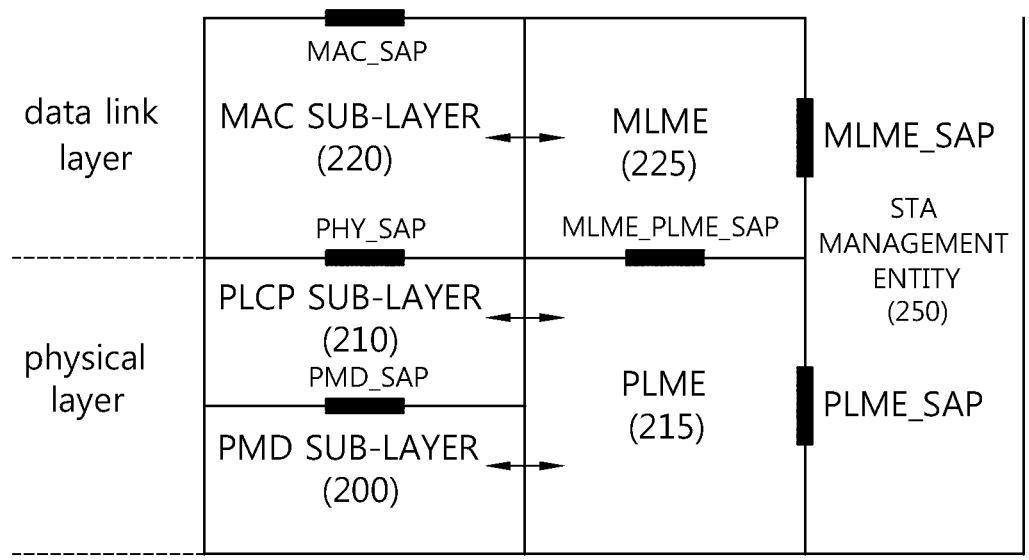
FIG. 2 is a view illustrating a hierarchical architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210.

The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
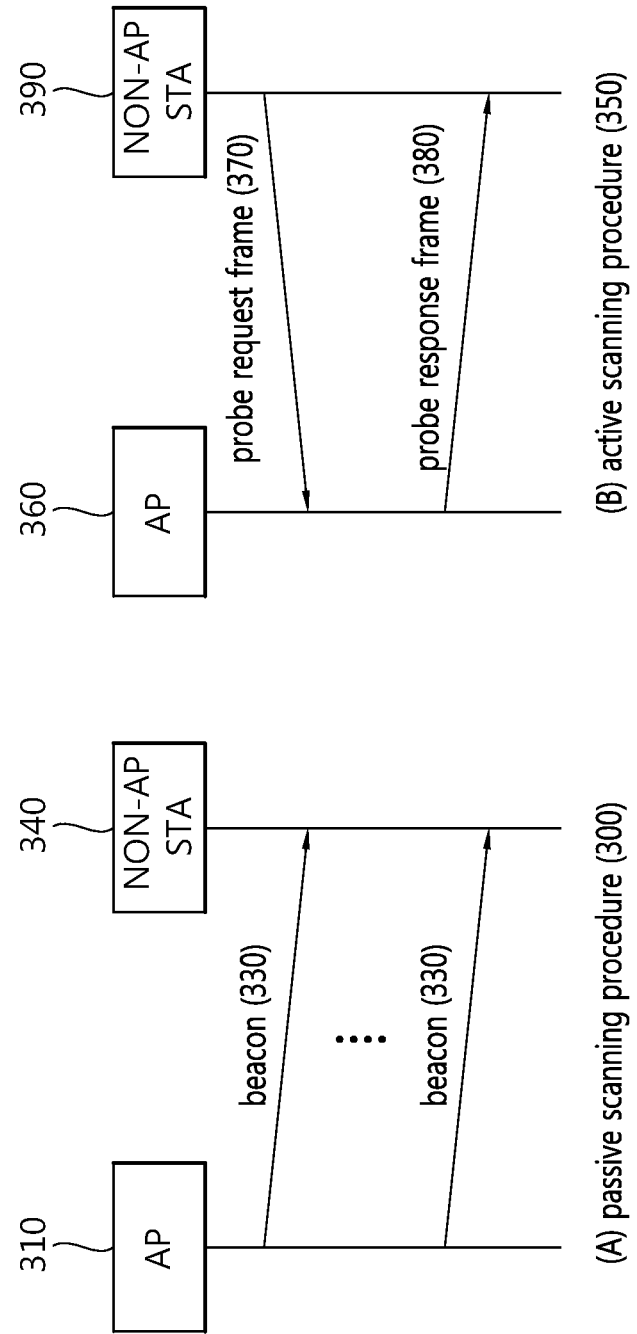
FIG. 3 is a conceptual view illustrating a scanning method in a WLAN.

FIG. 3 is a concept view illustrating a scanning method in a WLAN.

Referring to FIG. 3, the scanning method may be divided into passive scanning 300 and active scanning 350.

Referring to a left part of FIG. 3, the passive scanning 300 may be performed by a beacon frame 330 that is periodically broadcast from the AP 310. The AP 310 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a fast initial link setup (FILS) discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID, BSSID) of an AP that transmits the FILS discovery frame. It may be implemented that the FILS discovery frame is transmitted to an STA before the beacon frame is transmitted, and thus, the STA may search that an AP is existed in the corresponding channel beforehand. An interval of which the FILS discovery frame is transmitted in one AP is referred to as an FILS discovery frame transmission interval. The FILS discovery frame may be transmitted with a part of information included in the beacon frame being included. The FILS discovery frame may also include information for a transmission time of the beacon frame of neighbor AP.

Referring to a right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
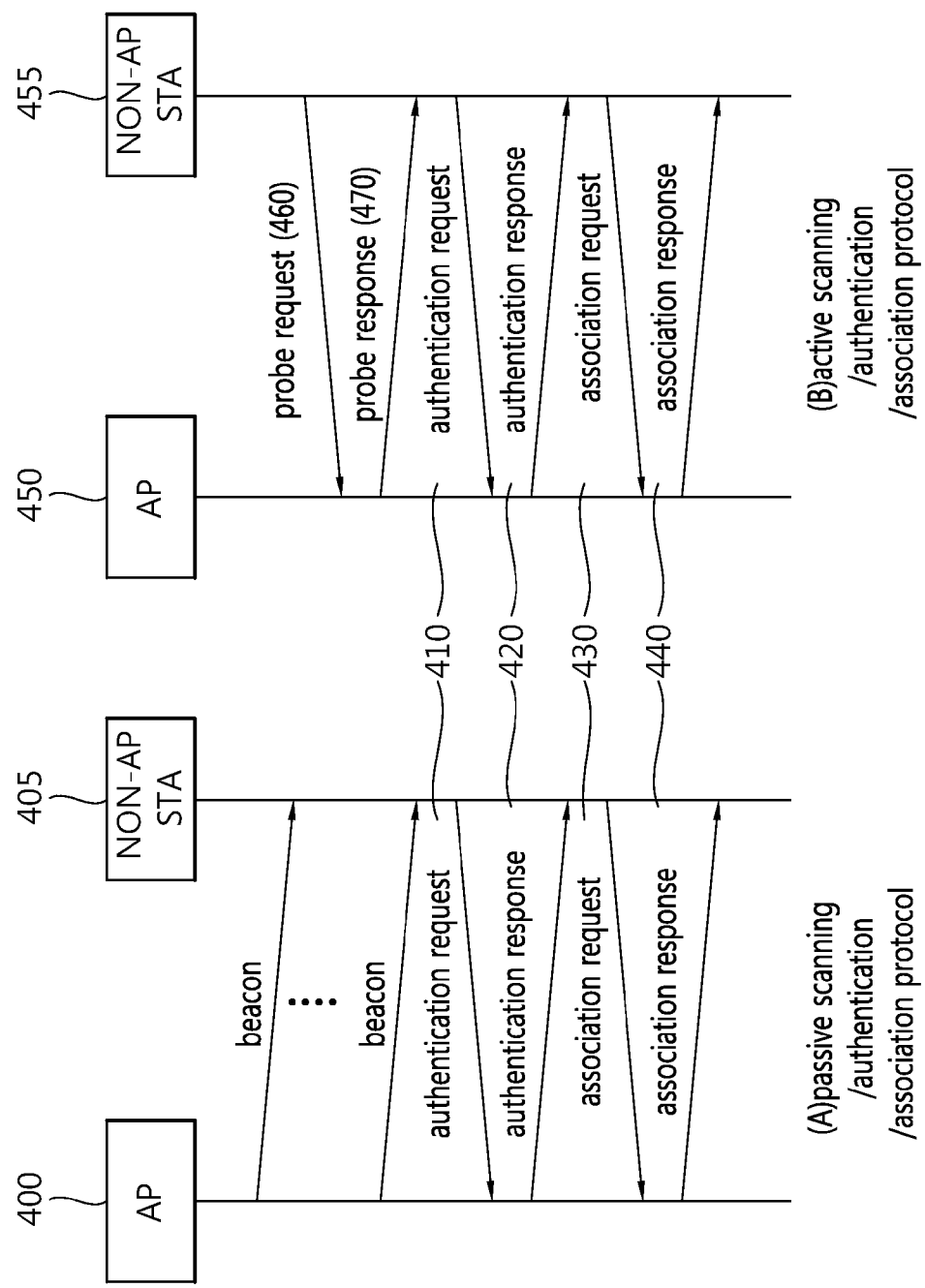
FIG. 4 is a conceptual view illustrating an authentication and association process after scanning an AP and a STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. A left part of FIG. 4 is a concept view illustrating an authentication and association process after passive scanning, and a right part of FIG. 4 is a concept view illustrating an authentication and association after active scanning.

The authentication and association process may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 400 or 450 to the non-AP STA 405 or 455. The transmitted association request frame 430 contains information on the capability of the non-AP STA 405 or 455. Based on the information on the capability of the non-AP STA 405 or 455, the AP 400 or 450 may determine whether the non-AP STA 405 or 455 may be supported. In case such support is possible, the AP 400 or 450 may include in the association response frame 440 whether to accept the association request frame 430 and a reason therefore, and its supportable capability information, and the AP 400 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
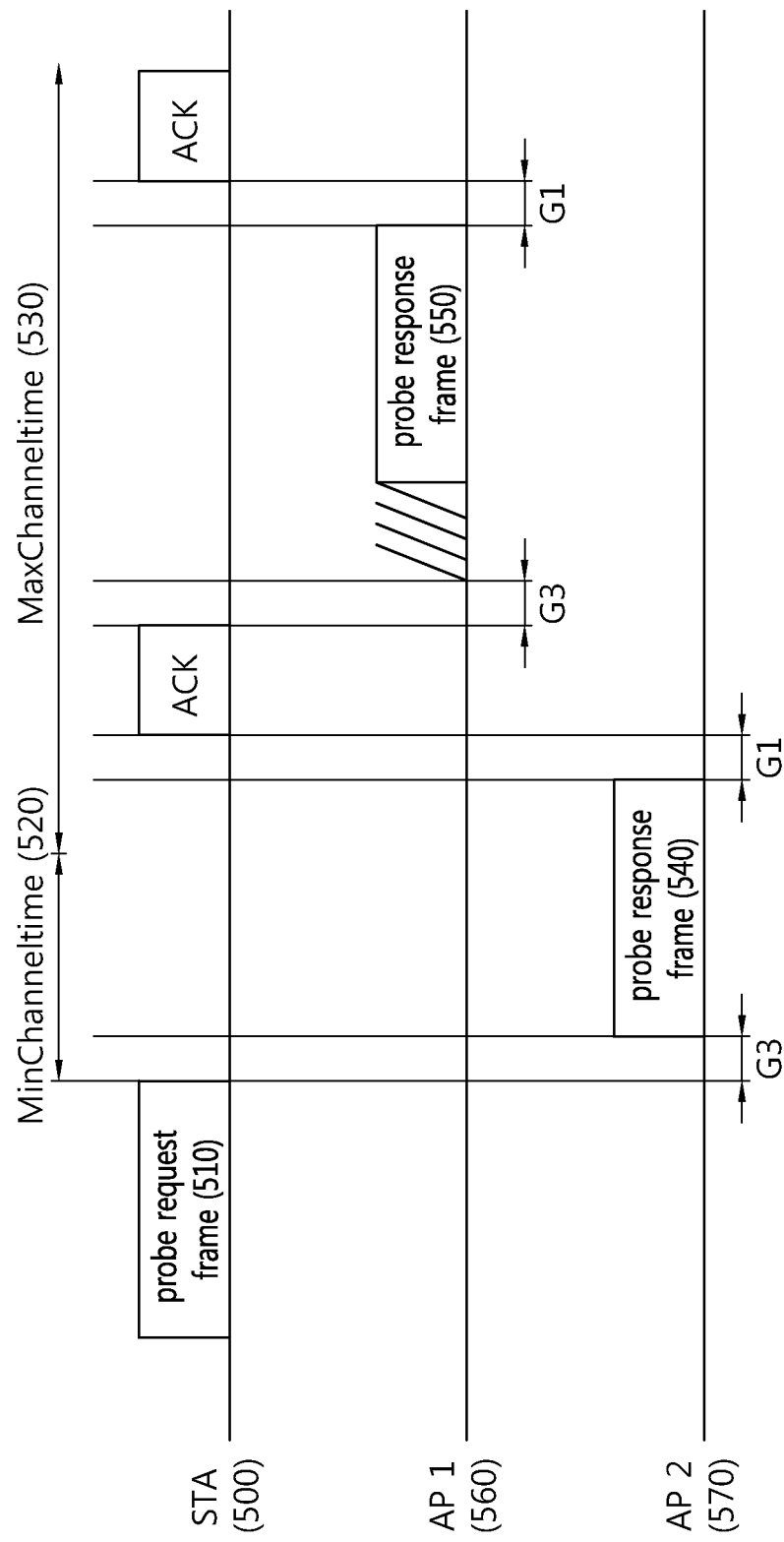
FIG. 5 is a conceptual view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 540 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 540 and 550 to the STA 500.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 540 and 550 until the minimum channel time 520, the STA 500 shifts scanning channels to perform scanning on other channel. In case the STA 500 receives the probe response frame 550 until the minimum channel time 520, it may process the received probe response frames 540 and 550 after waiting until the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 540 and 550 received by the STA 500 when PHY-CCA.indication is detected to be busy and may determine that there are no probe response frames 540 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 540 and 550 after the probe timer reaches the maximum channel time 530. After the process on the received probe response frames 540 and 550 is done, the STA 500 may set the NAV (net allocation vector) to 0 and may then scan a next channel.

Hereinafter, in embodiments of the present invention, determining whether there are probe response frames 540 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems— Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

FIG. 6 is a concept view illustrating a probe request frame transmission method.

FIG. 6 discloses methods of broadcasting, multicasting, and unicasting probe request frames from an STA.

An upper part of FIG. 6 shows a method in which the STA 600 broadcasts the probe request frame 610.

The STA 600 may include a wildcard SSID and a wildcard BSSID in the probe request frame 610 and broadcast the probe request frame 610.

TABLE 1

| name | description |
| --- | --- |
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The wildcard SSID and the wildcard BSSID may be used as identifiers to indicate all of the APs 605-1, 605-2, 605-3, 605-4, and 605-6 included in the transmission range of the STA 600.

In case the STA 600 transmits the probe request frame 610 with the wildcard SSID and the wildcard BSSID included in the probe request frame 610, the APs 605-1, 605-2, 605-3, 605-4, and 605-6 that have received the probe request frame 610 from the STA 600 may send probe response frames to the STA 600 in response to the received probe request frame.

In case the APs 605-1, 605-2, 605-3, 605-4, and 605-6 that have received the broadcast probe request frame 610 send the probe response frames to the STA 600 in response to the received probe request frame 610 within a predetermined time, the problem may occur that the STA 600 should simultaneously receive and process too many probe response frames.

An middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 625 corresponding to the SSID/BSSID specified by the STA 620 may transmit a probe response frame to the STA 620.

An lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

As described above, existing STAs may determine, based on the SSID and BSSID included in the MLME.SCAN-request primitive, whether they unicast, multicast, or broadcast a probe request frame. The probe request frame may be unicast, multicast, or broadcast based on the following settings of the MLME.SCAN-request primitive.

In case the MLME.SCAN request primitive includes a particular BSSID, the STA unicasts a probe request frame to an AP with the particular BSSID. The particular BSSID of the AP may be included in the address field of the MAC header in the unicast probe request frame.

In case the MLME.SCAN request primitive includes an SSID or an SSID list along with a wild card BSSID, the STA may multicast a probe request frame to the AP corresponding to the SSID or SSID list. The SSID or SSID list may be included in the probe request frame, and the BSSID may be included in the address field of the MAC header in the probe request frame.

In case the MLME.SCAN request primitive includes a wild card SSID, the STA may broadcast a probe request frame. The wild card SSID may be included in the probe request frame, and a wild card BSSID may be included in the address field of the MAC header.

When the AP receives the probe request frame from the STA, the AP may transmit a probe response frame to the STA which has transmitted the probe request frame. When transmitting the probe response frame, the AP may broadcast the probe response frame. For example, when the AP receives probe request frames from a plurality of STAs, the AP may determine whether to broadcast a probe response frame on the basis of information included in the received probe request frame. For example, requests included in the probe request frames transmitted from the plurality of STAs are the same, the AP may broadcast a probe response frame such that the plurality of STAs may receive it.

According to an embodiment of the present invention, when performing active scanning, the STA may determine whether to transmit a probe request frame. Hereinafter, in an embodiment of the present invention, a method of determining whether to transmit a probe request frame by the STA and transmitting a probe request frame will be described. Hereinafter, in the embodiment of the present invention, the STA determining whether to transmit a probe request frame will be referred to as a scanning STA, and an AP which the STA wants to transmit the probe request frame and from which the STA wants to receive a probe response frame will be referred to as a target AP.

The scanning STA may receive a probe request frame transmitted from a nearby STA and obtain a required response from the target AP on the basis of the received probe request frame. For example, in a case in which the target AP receives a probe request frame transmitted from a nearby STA and broadcasts a probe response frame in response thereto, the scanning STA may be able to receive a response desired to be obtained through scanning from the target AP.

In this case, the STA may monitor a probe response frame transmitted from the target AP. Alternatively, in a case in which the STA receives a probe response frame, a beacon frame, a FILS discovery frame, or a measurement pilot frame broadcast from the target AP before transmitting a probe request frame, the STA may perform scanning and receive a response desired to be received from the target AP. Even in this case, the STA may not transmit a probe request frame.

However, in a case in which the STA performs scanning of the target AP through a probe request frame transmitted from other STA, rather than transmitting a probe request frame, various problems may arise as follows.

First, a hidden node problem may arise. A case in which a first STA receives a probe request frame broadcast by a second STA and omits transmission of a prober request frame may be assumed. In this case, an AP which has received the probe request frame transmitted from the second STA may broadcast or unicast a probe response frame. However, the first STA may be a hidden node with respect to the AP which has transmitted the probe response frame. In a case in which the first STA is a hidden node, the first STA may not be able to receive the probe response frame transmitted from the AP. In this case, since the first STA cannot receive the probe response frame during a maximum channel time (MaxChannelTime), the first STA moves a scanning channel to a different channel and performs scanning. In this case, a problem that, even though the target AP exists in the corresponding channel, the first STA does not transmit a probe request frame in the corresponding channel and moves to a different channel to perform scanning, may arise.

Another problem is that a problem may arise due to collision. A case in which the first STA receives a probe request frame broadcast by the second STA and omits transmission of a probe request frame is assumed. In this case, an AP, which has received the probe request frame transmitted from the second STA, may broadcast or unicast a probe response frame. When the probe response frame transmitted by the AP collides with a different signal, the first STA may not be able to receive the probe response frame transmitted from the AP. In this case, since the first STA cannot receive the probe response frame for a maximum channel time, the first STA may move a scanning channel to a different channel and perform scanning.

In a case in which the first STA unicasts a probe request frame in a corresponding channel, if the AP fails to receive ACK with respect to a probe response frame which has been unicast by the first STA, the first STA may retransmit the probe response frame. However, in a case in which transmission of the probe request frame is omitted, if the STA fails to receive a probe response frame, the STA moves the scanning channel to a different channel, and thus, even though a target AP exists in the corresponding channel, the STA cannot scan the target AP.

Another problem is that the AP may broadcast a probe response frame in response to a probe request frame broadcast by the second STA, but the AP may transmit the probe response frame in a unicast manner in terms of implementation of the AP. In a case in which the AP transmits the probe response frame only to the second STA in a unicast manner, the first STA cannot receive the probe response frame which has been unicast by the first STA.

In order to solve such problems, in an embodiment of the present invention, it is determined that a scanning STA receives a probe request frame transmitted by a different STA and does not transmit a probe request frame, and in a case in which a desired response is not received from an AP, an operation of the scanning STA is started.

Figure 7:
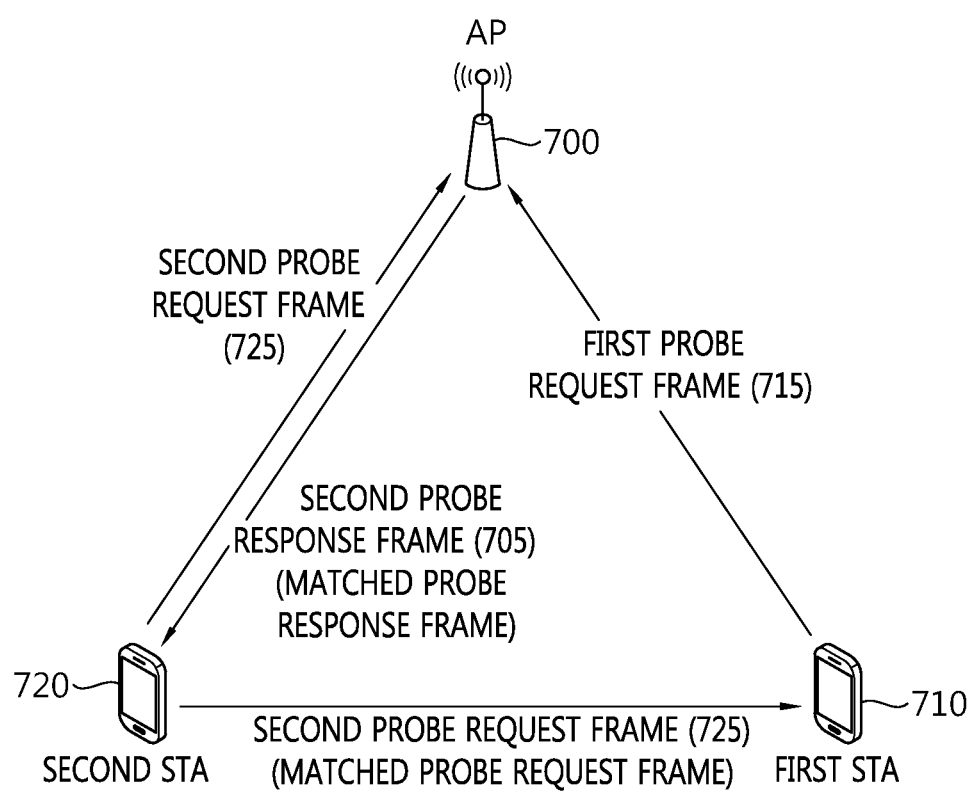
FIG. 7 is a conceptual view illustrating a scanning method of a STA according to an embodiment of the present invention.

FIG. 7 is a conceptual view illustrating a scanning method of a STA according to an embodiment of the present invention.

Referring to FIG. 7, a second STA 720 may transmit a second probe request frame 725 for scanning. The second probe request frame transmitted by the second STA 720 may be a broadcast frame. A first STA 710 may receive the second probe request frame 725 transmitted from the second STA 720.

The first STA 710, a scanning STA, may determine whether transmission of the second probe request frame is permitted on the basis of the received second probe request frame and scanning information. Here, the scanning information may be information included in a MLME-SCAN request primitive generated by the first STA to perform active scanning. Hereinafter, in an embodiment of the present invention, the MLME-SCAN request primitive may be referred to as scanning information.

Whether transmission of a first probe request frame, a separate probe request frame, is permitted may be determined by the first STA 710 on the basis of whether a response anticipated to be received from the AP on the basis of the generated scanning information and whether the second probe request frame allows for at least the same response.

For example, the first STA 710 may determine whether a response with respect to information indicated through the scanning information of the first STA 710 can be obtained from the AP 700 on the basis of the received second probe request frame 725. That is, the first STA 710 may determine whether information which has been intended to be received from the AP 700 through a probe request frame which has been intended to be transmitted on the basis of the scanning information can be obtained through the second probe response frame 725. The second probe response frame. A second response frame 705 may be a response with respect to the second probe request frame 725 transmitted from the second STA 720.

Hereinafter, in a case in which a probe request frame received from a different STA is a frame that may induce a response intended to be received from the AP on the basis of scanning information of a scanning STA, a probe request frame received by the scanning STA may be referred to as a matched probe request frame.

The first STA 710, as a scanning STA, may determine whether transmission of a separate probe request frame is permitted on the basis of the received second probe request frame and the scanning information. When the second probe request frame 725 received by the first STA 710 is not a matched probe request frame according to the determination result, the first STA 710 may generate a separate probe request frame 715 on the basis of the scanning information and transmits the same to the AP.

Conversely, the first STA 710, as a scanning STA, may determine whether transmission of a separate probe request frame is permitted on the basis of the received second probe request and the scanning information. When the second probe request frame 725 received by the first STA 710 is a matched probe request frame according to the determination result, the first STA 710 may monitor a frame received through a channel, rather than transmitting a separate probe request frame. The first STA 710 may monitor whether a probe response frame including at least the same information anticipated to be received on the basis of the scanning information is transmitted. The probe response frame including at least the same information anticipated to be received on the basis of the scanning information may be a probe response frame 705 transmitted by the AP in response to the matched probe request frame 725 transmitted from the second STA. Hereinafter, the probe response frame including at least the same information anticipated to be received on the basis of the scanning information will be referred to as the probe response frame 705.

According to an embodiment of the present invention, in a case in which the first STA 710 monitors a preset channel time and a frame is not searched in a channel for the preset channel time or in a case in which a frame is searched in the channel for the preset time but a matched probe response frame fails to be received, the first STA 710 may transmit a separate first probe request frame 715 to scan the AP 700 present in the channel again.

For example, in a case in which it is not permitted to transmit a separate probe request frame such as a first probe request frame to the AP, the first STA may perform a clear channel assessment (CCA) to detect a channel state in the reception channel and start a probe timer.

The first STA 710 may detect a frame transmitted from a different STA or the AP for a minimum channel time. The first STA 710 may set the probe timer to 0 and start the probe timer.

When the channel state is not busy until the probe timer reaches the minimum channel time, the first STA may transmit a first probe request frame, a separate probe request frame, to the AP in the reception channel.

Conversely, in a case in which the channel state is busy until the probe timer reaches the minimum channel time and a matched probe response frame is not received for the probe timer does not reach a maximum channel time, the first STA may transmit a first probe request frame, a separate probe request frame, to the AP in the reception channel.

That is, when the matched probe response frame 705 is not received until the probe timer reaches a preset time, the first STA 710 may transmit a separate first probe request frame 715 to the AP 700 when the probe timer reaches the maximum channel time or before the probe timer reaches the maximum channel time (for example, the minimum channel time).

For example, in a case in which the channel state is not busy before the probe timer reaches the minimum channel time, the first probe request frame may be transmitted before the probe timer reaches the maximum channel time. Conversely, when the channel state is busy before the probe timer reaches the minimum channel time, the first probe request frame may be transmitted when the probe timer reaches the maximum channel time.

In such a case, transmission of the first probe request frame 715 by the first STA 710 may not be omitted. When the first STA 710 fails to receive the probe response frame 705 from the AP 700 using such a method, the first STA 710 transmits a separate probe request frame 715 in the same channel. Thus, occurrence of a situation in which the first STA 710 cannot scan the AP 700 in spite of the presence of the AP in the corresponding channel due to a hidden node problem, a collision problem, or a problem in terms of implementation of an AP can be prevented.

Figure 8:
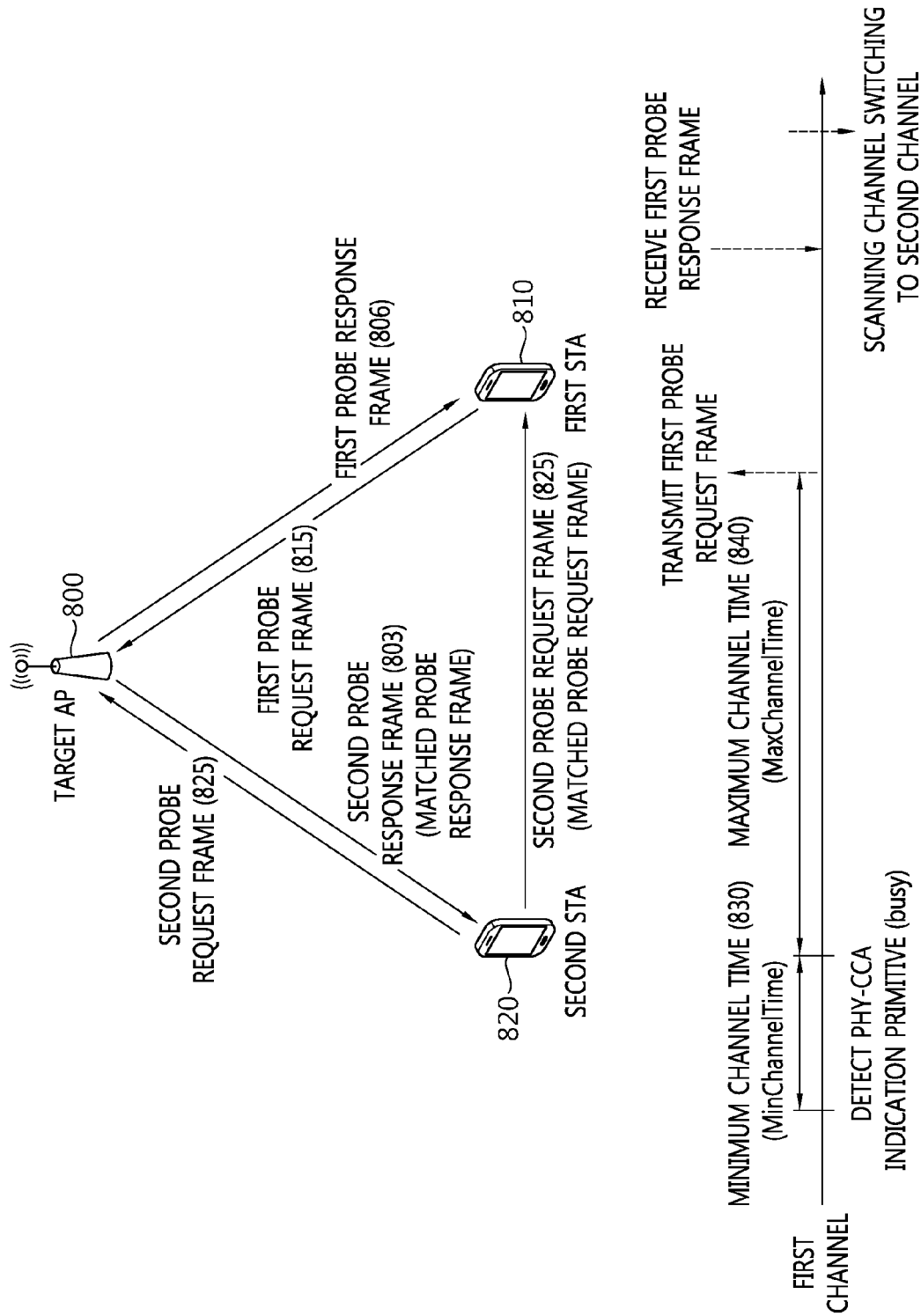
FIG. 8 is a conceptual view illustrating an operation of a STA according to an embodiment of the present invention.

FIG. 8 is a conceptual view illustrating an operation of an STA according to an embodiment of the present invention.

FIG. 8 specifically illustrates an operation of a first STA 810 when the first STA 810 detects that a first channel is busy, after performing CCA detection for a minimum channel time 830 in a channel. In FIG. 8, it is assumed that a probe response frame 803 to which the first STA 810 is matched is monitored in a first channel, like the situation of FIG. 7 described above.

The first STA 810 may recognize whether a first channel is busy on the basis of whether a PHY-CCA indication primitive (busy) is received until the minimum channel time 830 set in the probe timer expires. In a case in which the PHY-CCA indication primitive (busy) is received for the minimum channel time 830, the first STA 810 may monitor the first channel before a maximum channel time 840 set in the probe timer.

When the matched probe response frame 803 is received until the maximum channel, the first STA 810 may terminate the scanning procedure in the first channel. The matched probe response frame 803 may include a response with respect to a second probe request transmitted by a second STA 820 and a probe response frame including at least the same information anticipated to be received on the basis of scanning information of the second STA.

In this case, however, the first STA 810 may fail to receive the matched probe response frame 803 for the maximum channel time 840 set tin the probe timer. For example, the first STA 810 may fail to receive the matched probe response frame 803 due to a problem such that a target AP does not exist near the first STA 810 or due to a problem of a hidden node in spite of the presence of a target AP near the first STA 810, a collision problem, or a problem in terms of implementation of an AP. In this case, the first STA 810 may generate a first probe request frame 815 and transmit the same in the first channel. The first STA 810 may generate a first probe request frame 815 on the basis of existing generated scanning information or newly generated scanning information.

The first STA 810 may receive a first probe response frame 806 with respect to the transmitted first probe request frame 815, and may switch a scanning channel to a second channel, a different scanning channel, or terminate the scanning procedure. Alternatively, the first STA 810 may fail to receive the first probe response frame 806 in response to the transmitted first probe request frame 815, and in this case, the first STA 810 may set a net allocation vector (NAV) to 0 and switch the scanning channel to the second channel, a different channel, or may terminate the scanning procedure.

For example, in a case in which the first STA 810 fails to receive the matched probe response frame 803 up to the maximum channel time, as a response with respect to the matched probe request frame 825, the first STA 810 may perform the scanning procedure again through a procedure as follows.

The first STA 810 may transmit the first probe request frame 815 generated on the basis of the scanning information. The first STA 810 initializes the probe timer to 0 and subsequently operates the timer. When a frame received through a channel is not detected until minimum channel time set in the probe timer expires, the first STA 810 may shift the scanning channel to perform scanning in a different channel. Conversely, when a frame received through a channel is detected for the minimum channel time set in the probe timer, the first STA 810 monitors the channel and receives the first probe response frame 806 before the maximum channel time set in the probe timer.

For example, the first STA 810 may search for a PHY-CCA indication primitive for the minimum channel time set in the probe timer, and determine whether a different frame (for example, a probe response frame) has been received by the first STA 810 for the minimum channel time. When the PHY-CCA indication primitive is searched as being idle, the first STA 810 may set a net allocation vector (NAV) to 0 and scan a next channel. When the PHY-SCCA indication primitive is searched as being busy, the first STA 810 may process the received first probe response frame 806 for the maximum channel time set in the probe timer. After processing the received first probe response frame, the first STA 810 may set the net allocation vector (NAV) to 0 and scan a next channel.

Figure 9:
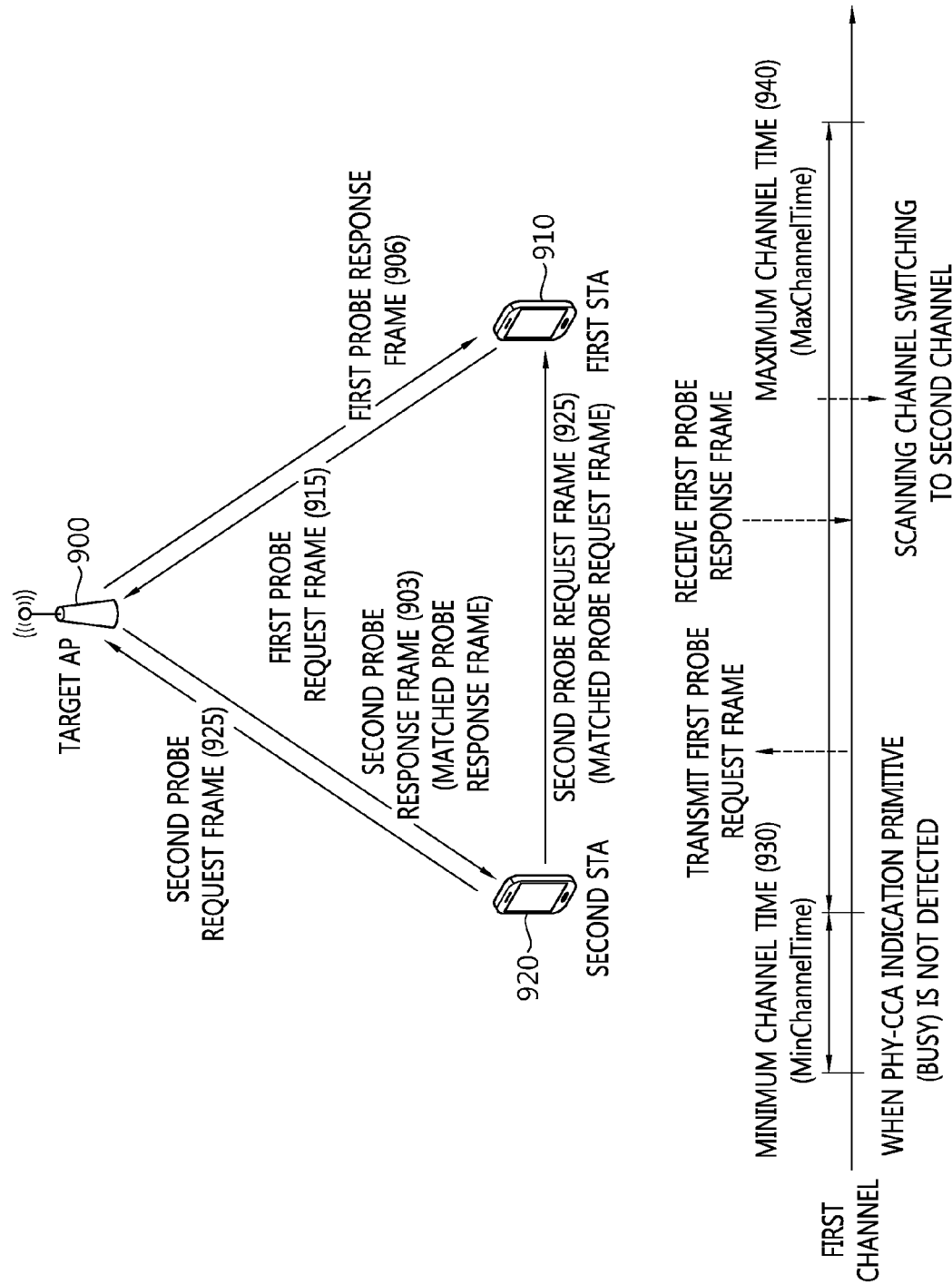
FIG. 9 is a conceptual view illustrating an operation of a STA according to an embodiment of the present invention.

FIG. 9 is a conceptual view illustrating an operation of an STA according to an embodiment of the present invention.

Specifically, FIG. 9 illustrates an operation of a first STA when it is detected that a channel is idle (namely, when it is detected that a channel is not busy) after performing CCA detection for a minimum channel time 930 in a first channel. In FIG. 9, it is assumed that a first STA 910 monitors a matched probe response frame 903 in a first channel, like the situation of FIG. 7.

The first STA 910 may recognize whether the first channel is busy according to whether a PHY-CCA indication primitive (busy) is detected for the minimum channel time 930. When the PHY-CCA indication primitive (busy) is not detected for the minimum channel time 930, the first STA 910 may transmit a separate first probe request frame 915 to a target AP 900. That is, when the first STA 910 fails to receive the PHY-CCA indication primitive (busy) for the minimum channel time 930, the first STA 910 may generate the first probe request frame 915 and transmits the same in the first channel. The first STA 910 may generate the first probe request frame 915 on the basis of scanning information and transmit the same. The first STA 910 may generate the first probe request frame 915 on the basis of existing generated scanning information or newly generated scanning information.

The first STA 910 may receive a first probe response frame 906 as a response to the first probe request frame 915, and may switch the scanning channel to a second channel, a different scanning channel, or terminate the scanning procedure. Alternatively, the first STA 910 may fail to receive the first probe response frame 906 as a response with respect to the transmitted first probe request frame 915, and in this case, the first STA 910 may set the NAV to 0 and switch the scanning channel to the second channel, a different channel, or terminate the scanning procedure.

For example, when the first STA 910 fails to receive the PHY-SCCA indication primitive (busy) for the minimum channel time, the first STA 910 may perform the scanning procedure again through a procedure as follows.

The first STA 910 may transmit the first probe request frame 915 generated on the basis of a MLME-SCAN request primitive. The first STA 910 initializes the probe timer to 0 and subsequently operates the timer. When a frame received through a channel is not detected until minimum channel time set in the probe timer expires, the first STA 910 may shift the scanning channel to perform scanning in a different channel. Conversely, when a frame received through a channel is detected for the minimum channel time set in the probe timer, the first STA 910 monitors a channel and receives the first probe response frame 906 before the maximum channel time set in the probe timer.

For example, the first STA 910 may search for a PHY-CCA indication primitive for the minimum channel time set in the probe timer, and determine whether a different frame (for example, a probe response frame) has been received by the first STA 810 for the minimum channel time. When the PHY-CCA indication primitive is searched as being idle, the first STA 910 may set a net allocation vector (NAV) to 0 and scan a next channel. When the PHY-SCCA indication primitive is searched as being busy, the first STA 910 may process the received first probe response frame 906 for the maximum channel time set in the probe timer. After processing the received first probe response frame 906, the first STA 910 may set the net allocation vector (NAV) to 0 and scan a next channel.

Figure 10:
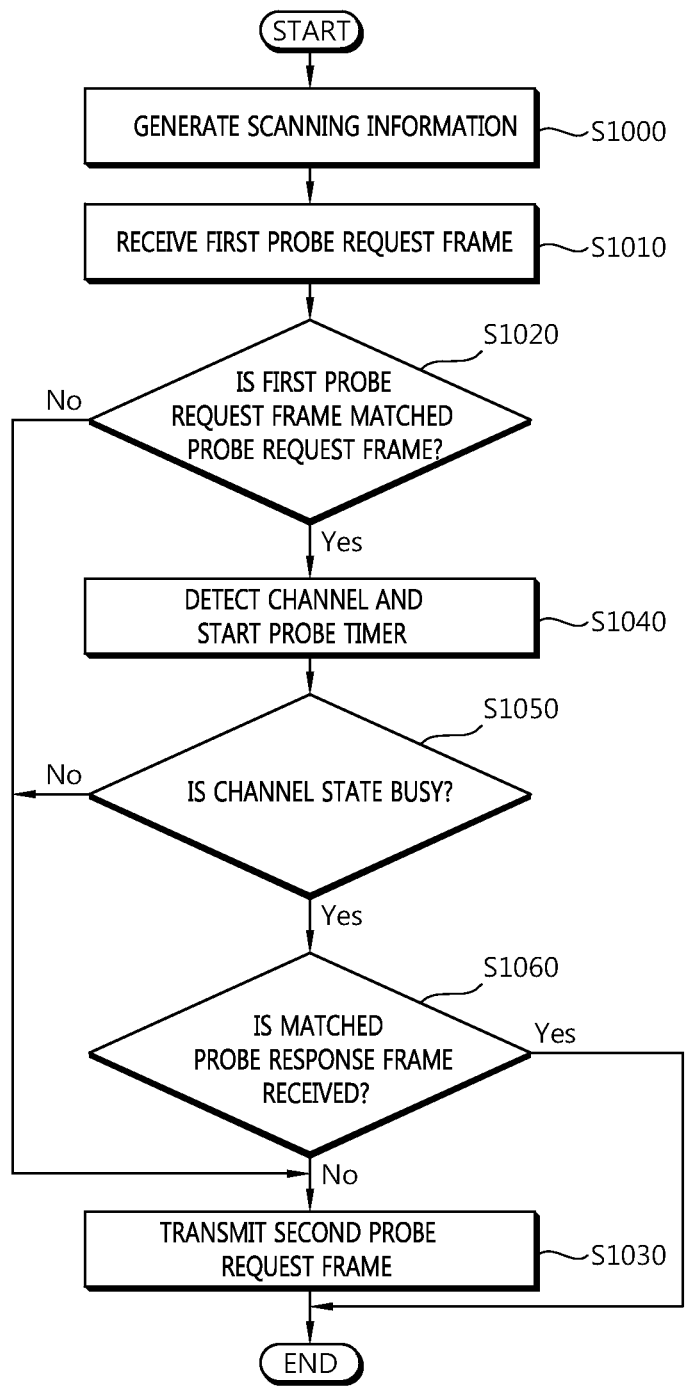
FIG. 10 is a flow chart illustrating a method for determining whether to transmit a probe request frame in a STA according to an embodiment of the present invention.

FIG. 10 is a flow chart illustrating a method for determining whether to transmit a probe request frame by a STA according to an embodiment of the present invention.

Referring to FIG. 10, a scanning STA generates scanning information for performing active scanning (step S1000).

The scanning STA may generate scanning information (for example, MLME-SCAN request primitive) for performing active scanning The scanning STA receives a first probe request frame through a reception channel (step S1010).

The scanning STA may receive a first probe request frame transmitted from a nearby STA. For example, the nearby STA may broadcast the first probe request frame, and the scanning STA may receive the first probe request frame transmitted from the nearby STA during a probe delay period.

In order to determine whether transmission of a second probe request frame is permitted on the basis of the received first probe request frame and the scanning information, the scanning STA may determine whether the first probe request frame permits at least the same response as a response anticipated to be received from an AP on the basis of the scanning information.

The scanning STA may determine whether a response with respect to information indicated through the scanning information of the scanning STA can be obtained on the basis of the received first probe request frame. For example, the scanning STA determines whether a response with respect to information indicated through the scanning information of the scanning STA can be obtained from the AP on the basis of the received first probe request frame by determining whether at least one field included in the first probe request frame and a field included in a scanning frame are the same. In detail, the first probe request frame may include a plurality of fields, and one of the plurality of fields may be a request information field including information intended to be received from the AP through a probe response frame. The scanning STA may determine whether to transmit the second probe request frame on the basis of whether information included in the request information field included in the first probe request frame is included in the scanning information.

When the first probe request frame permits a response anticipated for the scanning STA to receive from the AP on the basis of the scanning information, the first probe request frame may be called a matched probe request frame. A step of determining whether to transmit a separate second probe request frame on the basis of the received first probe request frame and the scanning information by the scanning STA may be a step of determining whether the first probe request frame is a matched probe request frame.

The scanning STA transmits the second probe request frame (step S1030).

In a case in which the received first probe request frame is not a matched probe request frame, the scanning STA may perform a separate scanning procedure by transmitting a second probe request frame.

In order to detect a channel state in a reception channel, a clear channel assessment (CCA) is performed and the probe timer is started (step S1040).

In a case in which the received first probe request frame is a matched probe request frame, the scanning STA may wait for transmission of the probe request frame, performs CCA to detect a channel state of a reception channel waiting for transmission of the probe request frame, and start the probe timer to monitor a frame transmitted through a reception channel.

It is determined whether the channel state is busy until a minimum channel time set in the probe timer expires (step S1050).

The scanning STA may preferentially determine whether to transmit a second probe request frame on the basis of the channel state until the minimum channel time set in the probe timer expires.

When the channel is not busy until the minimum channel time set in the probe timer expires, the scanning STA may transmit the second probe request frame to the AP in a reception channel (step S1030).

When the channel state set in the probe timer is not busy until the minimum channel time expires, the scanning STA may transmit a separate second probe request frame to the AP to perform a scanning procedure on a nearby target AP before the maximum channel time.

When the channel state is busy until the minimum channel time set in the probe timer expires, the scanning STA determines whether a matched probe response frame has been received for the maximum channel time (step S1060).

For example, when a particular frame is received through a channel until the minimum channel time set in the probe timer expires, the scanning STA receives the frame from the channel during the maximum channel time, and determine whether to transmit a separate second probe request frame on the basis of whether there is a matched probe response frame among received frames.

When the matched probe response frame is not received while the probe timer is less than the maximum channel time, the scanning STA may transmit the second probe request frame to the AP in the reception channel (step S1030).

The matched probe response frame may be a frame including at least the same information anticipated to be received by the scanning STA based on the scanning information. For example, the scanning STA transmits the second probe request frame to the reception channel to perform a separate scanning procedure when the probe timer reaches the maximum channel time.

When the matched probe response frame is received while the probe timer is less than the maximum channel time, the scanning STA may end the scanning procedure in the corresponding channel without transmitting the separate second probe request frame.

Figure 11:
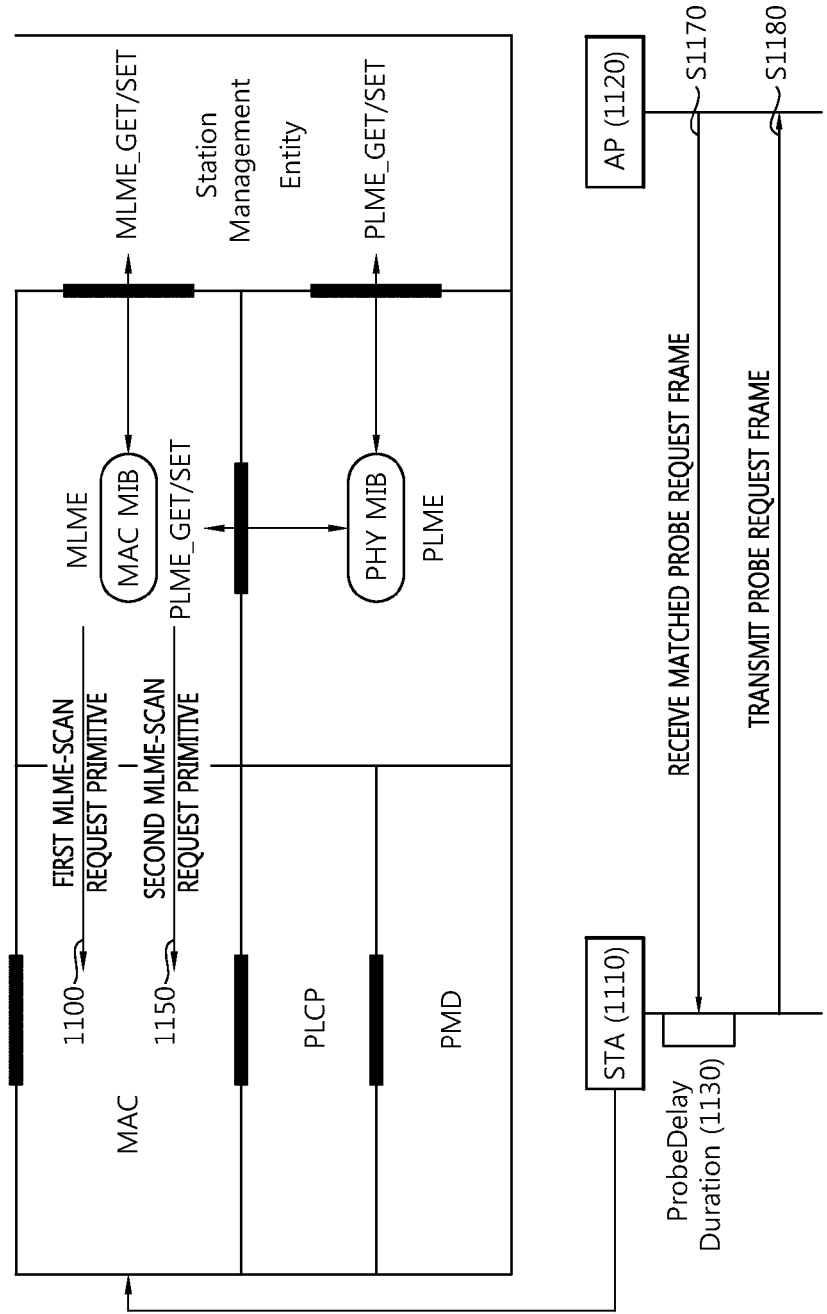
FIG. 11 is a conceptual view illustrating a method for re-transmitting a probe request frame according to an embodiment of the present invention.

FIG. 11 is a conceptual view illustrating a method for re-transmitting a probe request frame according to an embodiment of the present invention.

In FIG. 11, a method in which the STA generates the probe request frame based on scanning information (for example, MLME-SCAN.request primitive) is disclosed.

Referring to FIG. 11, the first MLME-SCAN.request primitive 1100 is transmitted to the MAC in the MLME, and as a result, the STA 1110 may be implemented to transmit the probe request frame. For example, when the STA 1110 receives the matched probe request frame in a probe delay interval 1130 (step S1170), the STA 1110 may not transmit the probe request frame based on the first MLME-SCAN-.request primitive 1100. The STA 1110 may monitor the matched probe response frame in the channel to receive the matched probe request frame.

When the STA receives the matched probe response frame from the AP 1120, the STA may set NAV to 0 and perform scanning in another channel. However, when the STA 1110 may not receive the matched probe response frame from the AP 1120, the STA 1110 may transmit the probe request frame again in the channel to perform the monitoring (step S1180).

For example, when the STA 1110 may not detect PHY-CCA indication primitive (busy) until the probe timer reaches the minimum channel time, the STA 1110 may transmit the probe request frame at a time corresponding to the minimum channel time or after the time corresponding to the minimum channel time. The probe request frame transmitted by the STA 1110 may be a frame generated based on the existing generated first MLME-SCAN.request primitive 1100 or newly generated second MLME-SCAN.request frame 1150. The second MLME-SCAN.request frame 1150 may be generated by indicating only contents changed from the first MLME-SCAN.request primitive 1100. For example, when information on the maximum channel time or the minimum channel time is changed, the second MLME-SCAN.request frame 1150 may be generated to include only the information on the maximum channel time or the minimum channel time which is the changed information.

On the contrary, when the STA 1110 detects the PHY-CCA indication primitive (busy) until the probe timer reaches the minimum channel time, the STA 1110 may monitor the channel until the probe timer reaches the maximum channel time. When the STA 1110 receives the matched probe response frame from the AP 1120 as described above, the STA 1110 may set NAV to 0 and move the scanning channel to another channel. However, when the STA 1110 may not receive the matched probe response frame until the maximum channel time, the STA 1110 may transmit individual probe request frames the monitoring channel at the time corresponding to the maximum channel time (step S1180). Similarly as described above, the probe request frame transmitted by the STA 1110 may be generated based on the first MLME-SCAN.request primitive 1100 or generated based on the second MLME-SCAN.request frame 1150 which is the new MLME-SCAN.request primitive. The second MLME-SCAN.request frame 1150 may be primitive indicating only contents changed from the first MLME-SCAN.request primitive 1100.

Figure 12:
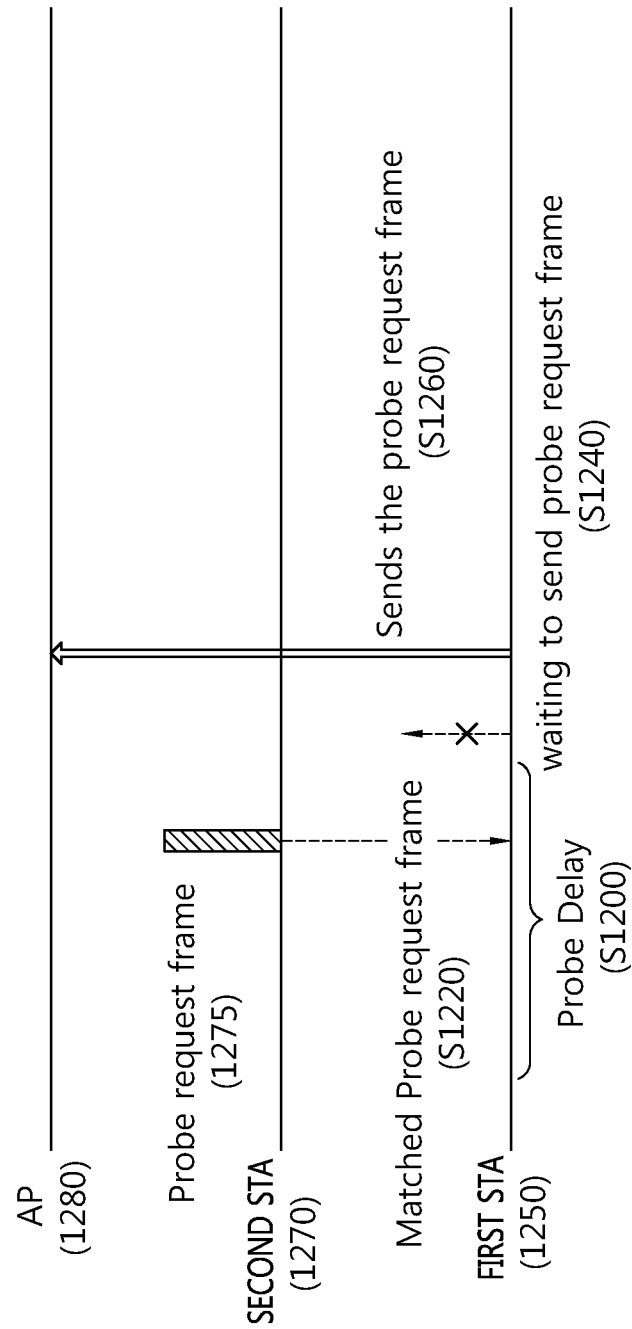
FIG. 12 is a flow chart illustrating a scanning procedure of a STA according to an embodiment of the present invention.

FIG. 12 is a flow chart illustrating a scanning procedure of a STA according to an embodiment of the present invention.

In FIG. 12, the STA which performs the active scanning procedure before transmitting the probe request frame is assumed and described. The STA may determine whether to transmit the separate probe request frame based on whether the received probe request frame is the matched probe request frame. The STA that performs the active scanning procedure before transmitting the prober request frame may be an STA temporally positioned in the probe delay interval. Hereinafter, a case will be assumed and described, in which the probe request frame received by the STA is the matched probe request frame and the probe response frame as a response to the matched probe request frame may not be received.

Referring to FIG. 12, a first STA 1250 may receive a probe request frame 1275 transmitted by a second STA 1270 in the probe delay interval (step S1200).

The first STA 1250 may determine whether to transmit the separate probe request frame based on whether the received probe request frame 1275 is the matched probe request frame (step S1220).

As described above, a frame including information which is at least the same as the information which the MLME-SCAN.request primitive indicates to the STA among the broadcasted probe request frames may be the matched probe request frame. For example, the first STA 1250 may determine as the matched probe request frame a frame in which at least some of the information which the MLME-SCAN.request primitive indicates to the first STA 1250 similar to the information included in the received probe request frame. As another example, when identifier information (for example, BSSID and SSID) of the AP included in the probe request frame 1275 transmitted by the second STA 1270 and identifier information of the AP included in the MLME-SCAN.request primitive are the same as each other, the first STA 1250 may determine the probe request frame transmitted by the second STA 1270 as the matched probe request frame.

When the first STA 1250 determines that the received probe request frame 1275 is the matched probe request frame, the first STA 1250 may stand by without transmitting the probe request frame (step S1240).

When the probe request frame received by the first STA 1250 is the matched probe request frame, a matched probe response frame transmitted from an AP 1280 may be monitored.

When the first STA may not receive the matched probe response frame, the first STA 1250 may transmit the separate first probe request frame to the AP 1280 when the probe timer reaches the maximum channel time or before the probe timer reaches the maximum channel time (for example, the minimum channel time). In this case, transmission of the probe request frame of the first STA 1250 may not be omitted.

When the first STA 1250 determines that the received probe request frame 1275 is an unmatched probe request frame, the first STA 1250 may stand by without transmitting the probe request frame (step S1260).

As a result in which the first STA 1250 detects the channel until the probe timer reaches the minimum channel time, when the signal is not detected, the first STA 1250 may transmit the separate probe request frame at the time corresponding to the minimum channel time or after the time corresponding to the minimum channel time.

As the result in which the first STA 1250 detects the channel until the probe timer reaches the minimum channel time, when the signal is detected (when the PHY-CCA indication primitive (busy) is detected), the first STA 1250 may stand by until the probe timer reaches the maximum channel time. When the frame received until the maximum channel time is not a probe response frame transmitted from a target AP, the STA 1250 may transmit the separate probe request frame at the time corresponding to the maximum channel time or after the time corresponding to the maximum channel time.

Figure 13:
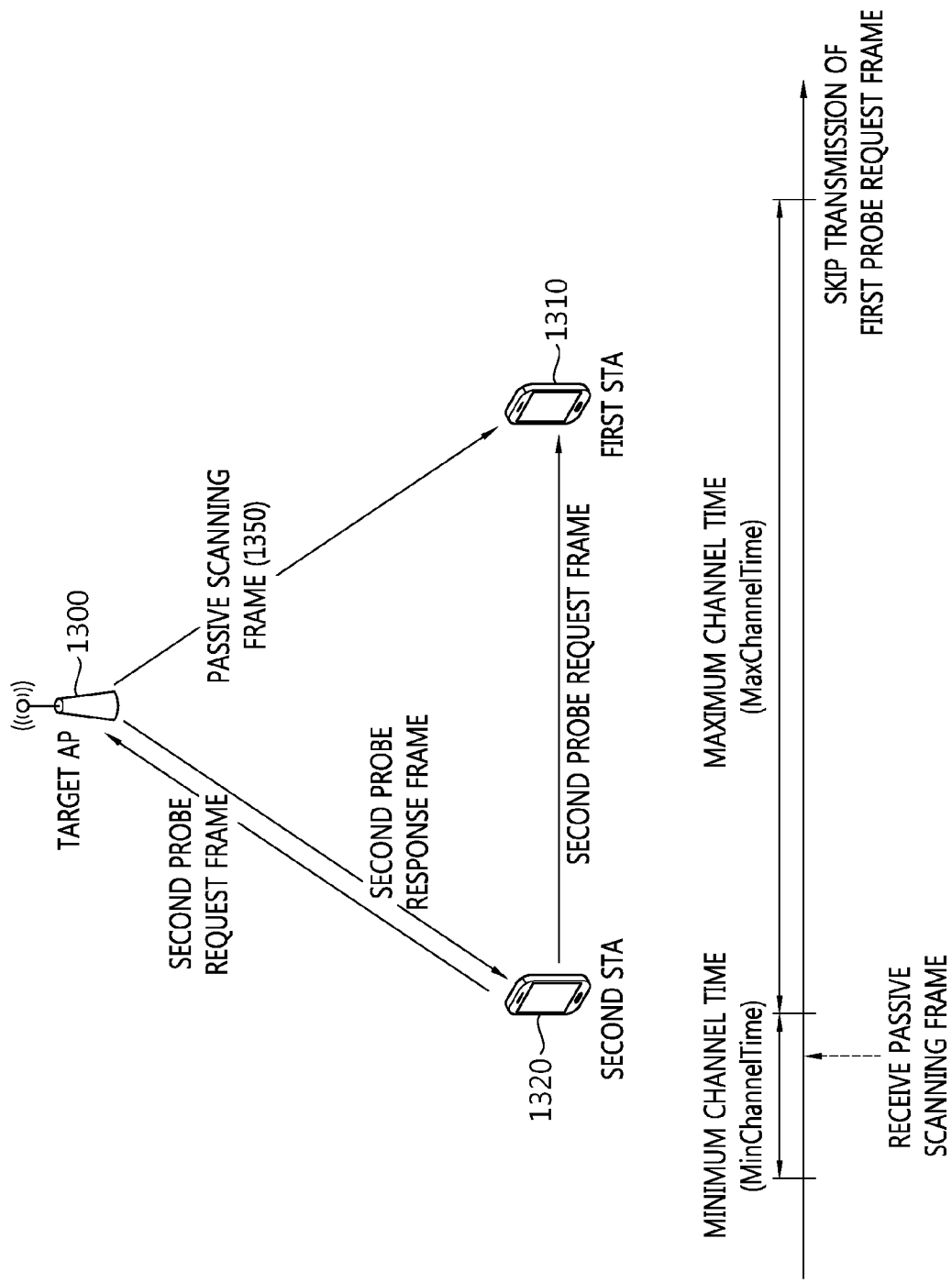
FIG. 13 is a conceptual view illustrating a scanning operation of a STA according to an embodiment of the present invention.

FIG. 13 is a conceptual view illustrating a scanning operation of a STA according to an embodiment of the present invention.

FIG. 13 is a conceptual view illustrating a case in which a first STA receives a frame such as a beacon frame, a measurement pilot frame, or an FILS detection frame from a target AP 1300.

Like the situation described in FIGS. 7 to 12, even in a situation in which the first STA 1310 may not receive the matched probe response frame from the target AP 1300, the first STA 1310 may receive the beacon frame, the measurement pilot frame, or the FILS detection frame from the target AP 1300. In this case, the first STA 1310 may not separately transmit the probe request frame. Hereinafter, in the embodiment of the present invention, the beacon frame, the measurement pilot frame, or the FILS detection frame will be referred to as a passive scanning frame 1350.

According to the embodiment of the present invention, when the passive scanning frame 1350 includes at least one response to the information indicated based on the MLME-SCAN.request primitive, the first STA 1310 may not transmit the separate probe request frame. The first STA 1310 may monitor the channel in order to receive the matched probe response frame as the response to the matched probe request frame transmitted by the second STA. The first STA may receive the passive scanning frame 1350 transmitted by the target AP 1300 while monitoring the channel. For example, when a channel state is busy before the probe timer reaches the minimum channel time and the beacon frame is received in the case where the probe timer is less than the maximum channel time, the first STA 1310 may end the scanning procedure in the corresponding channel without transmitting the separate probe request frame to the monitoring channel in spite of not receiving the probe response frame from the target AP 1300.

Figure 14:
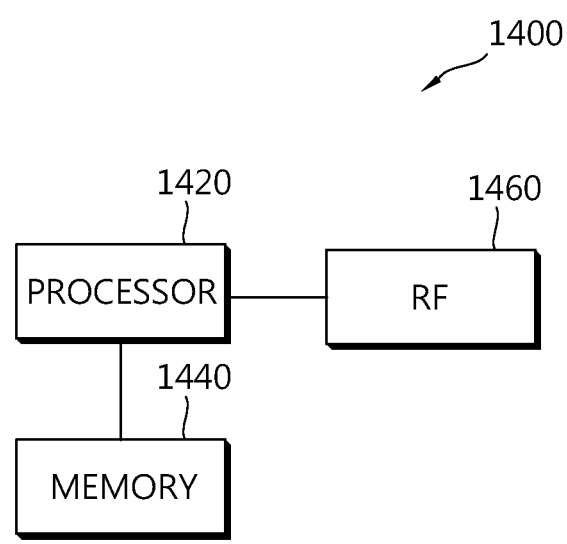
FIG. 14 is a block diagram illustrating a wireless device to which an embodiment of the present invention is applicable.

FIG. 14 is a block diagram illustrating a wireless device to which an embodiment of the present invention is applicable.

Referring to FIG. 14, the wireless device 1400 as an STA capable of implementing the aforementioned embodiment may be an AP or a non-AP station (STA).

The wireless device 1400 includes a processor 1420, a memory 1440, and a radio frequency (RF) unit 1460.

The RF unit 1460 is connected with the processor 1420 to transmit/receive a radio signal.

The processor 1420 implements a function, a process, and/or a method which are proposed in the present invention. For example, the processor 1420 may be implemented to perform an operation of the wireless device according to the embodiment of the present invention.

For example, the processor 1420 is configured to generate scanning information for performing an active scanning and receive a first probe request frame via a reception channel, the first probe request frame being a frame transmitted to an access point (AP) by a STA.

The processor (1420) is also configured to determine whether the first probe request frame is allow to receive same response from the AP based on the scanning information. When the first probe request frame is determined as a frame to receive at least one same response which the scanning STA want to receive from the AP, the scanning STA starts the probe timer and performs the CCA (clear channel assessment) to detect the channel state of the reception channel.

The processor 1420 is also configured to transmit a second probe request frame to the AP via the reception channel when the channel state is not busy before the probe timer reaches a minimum channel time. The processor 1420 is also configured to transmit the second probe request frame to the AP in the reception channel when the channel state is busy before the probe timer reaches the minimum channel time and a probe response frame including at least the same information anticipated to be received by the scanning STA based on the scanning information is not received until the probe timer reaches a maximum channel time, The processor 1420 may include an application-specific integrated circuit (ASIC), other chipset, a logic circuit, a data processing device, and/or a converter that converts a baseband signal and a radio signal to each other. The memory 1440 may include a read-only memory (ROM), a random access memory (RAM0, a flash memory, a memory card, a storage medium, and/or other storage device. The RF unit 1460 may include one or more antennas that transmit and/or receive the radio signal.

When the exemplary embodiment is implemented by software, the aforementioned technique may be implemented by a module (a process, a function, and the like) performing the aforementioned function. The module may be stored in the memory 1440 and may be executed by the processor 1420. The memory 1440 may be present inside or outside the processor 1420 and connected with the processor 1420 by various well-known means.

What is claimed is:

1. A method for performing active scanning in a wireless local area network (LAN), the method comprising:
    receiving, by a first station (STA), a first probe request frame broadcasted from a second STA; and
    determining, by the first STA based on the first probe request frame, whether to transmit a second probe request frame for an active scanning in response to the first probe request frame,
    wherein, when the determining includes determining, based on the first probe request frame, that the first STA is capable of receiving information related to a to-be-associated AP, the method further comprises:
        determining not to transmit the second probe request frame, and
        monitoring, while a timer of the first STA is less than a max channel time, for a probe response to the first probe request frame.

2. The method of claim 1, wherein the first probe request frame is received after the first STA has been received a MLME-SCAN.request.primitive for the active scanning.

3. The method of claim 1, further comprising:
    terminating, by the first STA, the active scanning on a channel on which the probe response frame is received when the timer reaches to the max channel time.

4. The method of claim 1, wherein the first STA determines not to transmit the second probe request frame when the first STA receives a beacon frame, a measurement pilot frame or a fast initial link setup (FILS) discovery frame from the AP to be associated.

5. The method of claim 1, wherein the first STA reports a result of the active scanning before the timer of the first STA reaches to the max channel time when the first STA receives a beacon frame, a measurement pilot frame or a fast initial link setup (FILS) discovery frame from the AP to be associated.

6. A scanning station (STA) for performing active scanning in a wireless local area network (LAN), comprising
a radio frequency unit configured to transmit and receive a radio signal; and
a processor coupled to the radio frequency unit and configured to:
receive a first probe request frame broadcasted from a peer STA, and
determine, based on the first probe request frame, whether to transmit a second probe request frame for an active scanning in response to the first probe request frame,
wherein, when the processor determines, based on the first probe request frame, that the scanning STA is capable of receiving information related to a to-be-associated AP, the processor:
determines not to transmit the second probe request frame, and
monitors, while a timer of the scanning STA is less than a max channel time, for a probe response to the first probe request frame.

7. The scanning STA of claim 6, wherein the first probe request frame is received after the scanning STA has been received a MLME-SCAN.request.primitive for the active scanning.

8. The scanning STA of claim 6, wherein the processor is further configured to:
terminate the active scanning on a channel on which the probe response frame is received when the timer reaches to the max channel time.

9. The scanning STA of claim 6, wherein the processor further determines not to transmit the second probe request frame when the scanning STA receives a beacon frame, a measurement pilot frame or a fast initial link setup (FILS) discovery frame from the AP to be associated.

10. The scanning STA of claim 6, wherein the scanning STA reports a result of the active scanning before the timer of the scanning STA reaches to the max channel time when the scanning STA receives a beacon frame, a measurement pilot frame or a fast initial link setup (FILS) discovery frame from the AP to be associated.

* * * * *